United States Patent
Cabaniss

[11] 3,734,304
[45] May 22, 1973

[54] MACHINE FOR HANDLING AIRCRAFT BRAKE ASSEMBLIES

[76] Inventor: Julian C. Cabaniss, Route 1, Box 152 Island Shoals Road, Henry County, near McDonough, Ga. 30233

[22] Filed: Dec. 28, 1970

[21] Appl. No.: 101,790

[52] U.S. Cl............214/1 BD, 214/1 D, 214/147, 214/149, 214/332
[51] Int. Cl............................B65g 7/08
[58] Field of Search............214/1 D, 147 G, 331, 214/332, 147 R, 149, 1 BD

[56] References Cited

UNITED STATES PATENTS

| | | | |
|---|---|---|---|
| 1,437,547 | 12/1922 | Pope | 214/149 |
| 1,490,664 | 4/1924 | Eidmann | 214/147 X |
| 2,752,054 | 6/1956 | Thompson | 214/147 G |
| 2,536,614 | 1/1951 | Syracusa | 214/1 D |
| 2,906,497 | 9/1959 | Wolf | 214/1 D |

FOREIGN PATENTS OR APPLICATIONS

| | | | |
|---|---|---|---|
| 6,401,831 | 8/1964 | Netherlands | 214/147 G |

Primary Examiner—Robert G. Sheridan
Assistant Examiner—George F. Abraham
Attorney—Patrick F. Henry

[57] ABSTRACT

Especially suited for one mechanic handling heavy disc brake assemblies, such as those removed from wheels of aircraft, the present apparatus comprises a wheeled frame which is controlled manually by a tongue. The frame supports a projecting clamp structure comprising a pair of clamps mounted in a clamp frame for complete rotation therein to be positioned on the brake assembly to lift and remove same and to lift and install same. The clamps are supported on clamp arms which are pivoted on a support means which is mounted on a horizontal pivot on the frame. The entire clamp frame is controlled in an arcuate vertical position by a long mechanical screw member between the frame and the support as is the clamping action of the bands. Thus the mechanic can position and orient the clamps on the brake assembly. Further positioning of the bands vertically is accomplished by means of another mechanical screw between the frame and the clamp support frame. In another form, the clamps and positioning thereof are operated hydraulically instead of mechanically.

13 Claims, 9 Drawing Figures

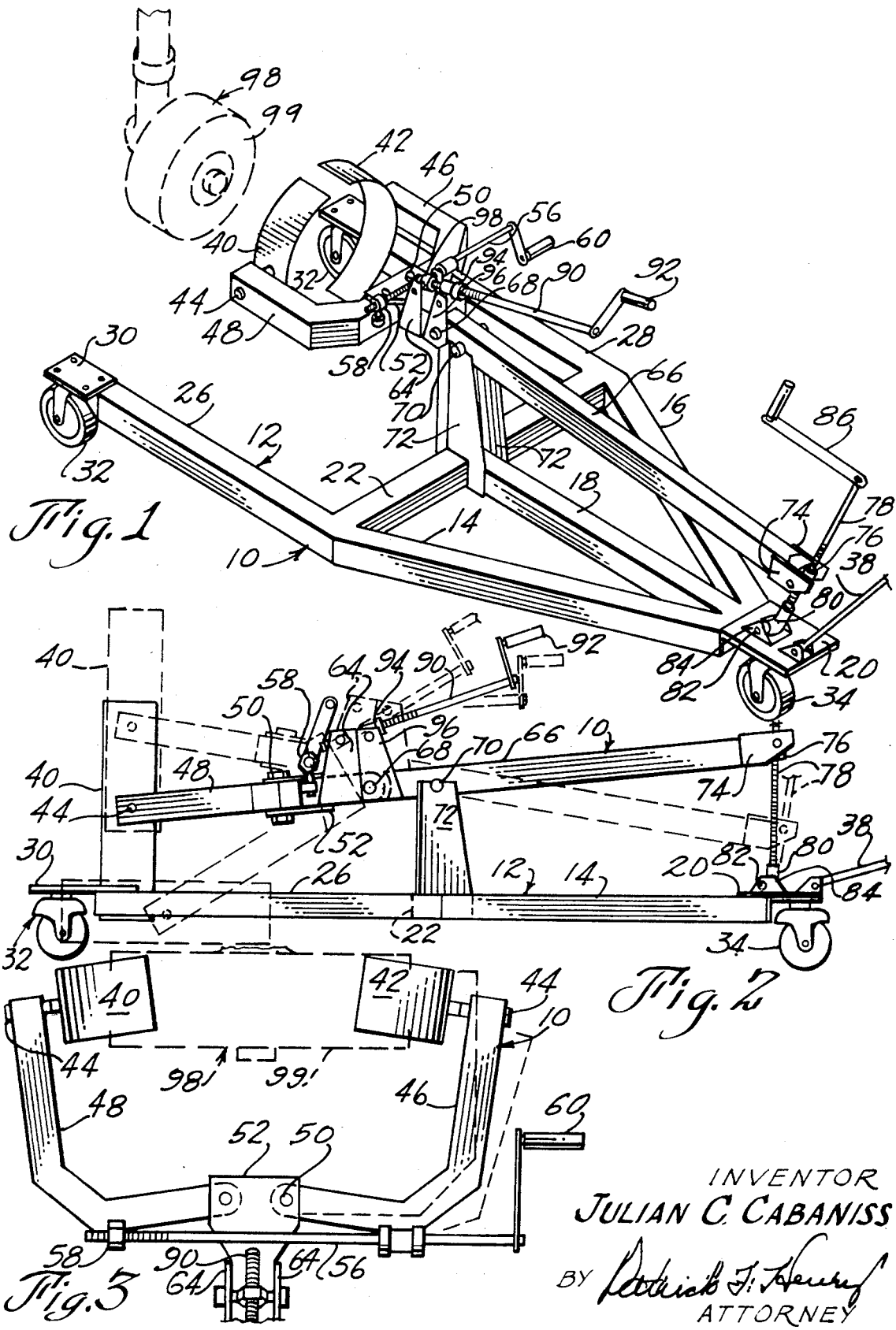

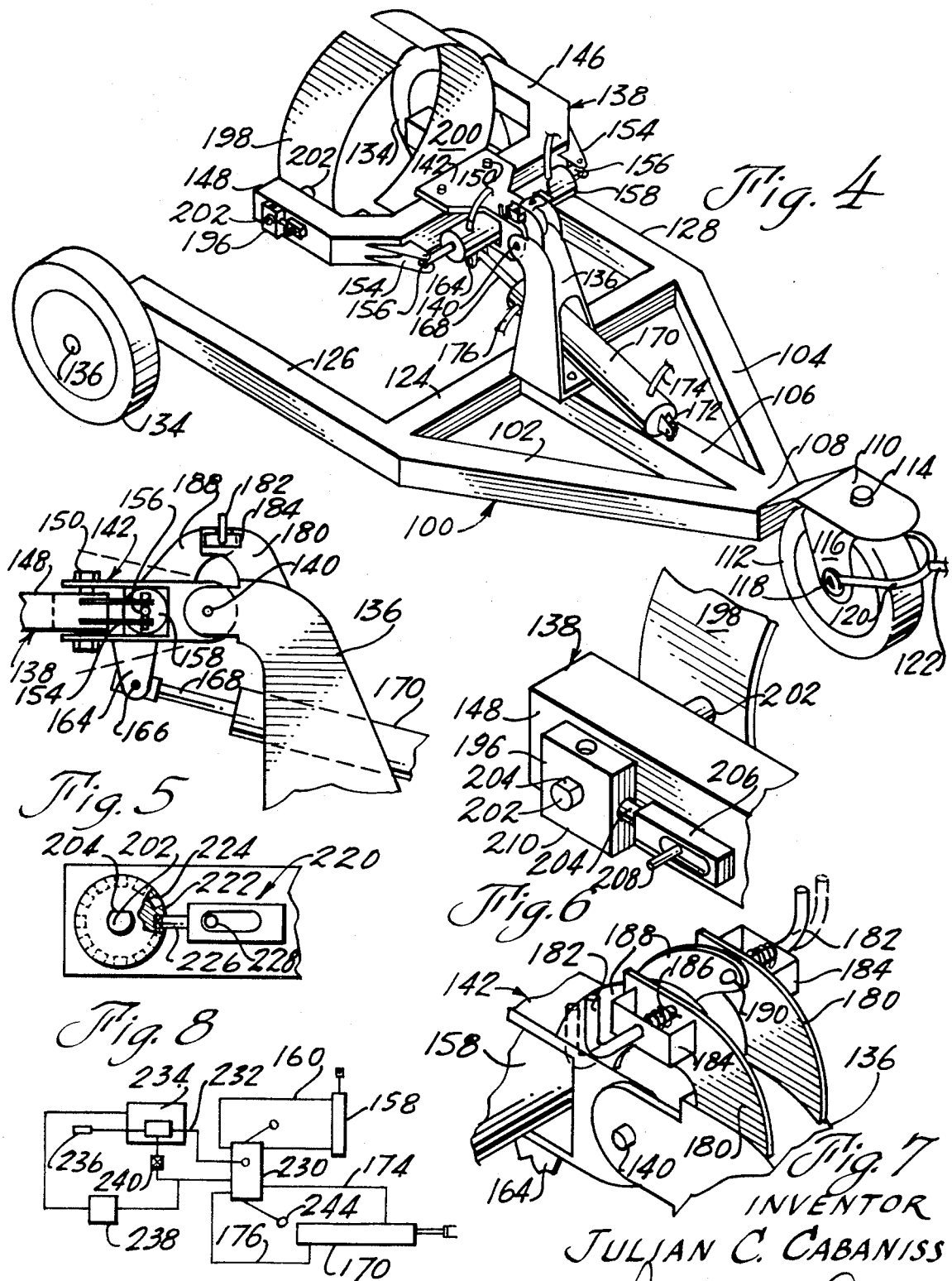

MACHINE FOR HANDLING AIRCRAFT BRAKE ASSEMBLIES

BACKGROUND OF THE INVENTION

1. Field of the Invention

Clamping tools particularly those mounted on wheels. Materials handling devices with special clamping means thereon and being wheel supported. Brake assembly removal tools and apparatus therefor.

2. Description of the Prior Art

The prior art includes wheeled jacks and similar devices which can be wheeled underneath brake assemblies or other items and lifted to engage same. These devices only provide some assistance in lifting the weight of the object and very little assistance in alignment for removing the object without a considerable amount of exertion by the mechanic and danger of over exertion resulting in back injury or the like. There are special devices for moving the rubber tired wheels of vehicles and airplanes but these devices are mainly concerned with detaching the wheels from the rest of the structure and necessarily do not have to deal with the problem of the weight of the wheel because it will support itself once removed. Brakes assemblies and similar heavy devices for aircraft must be handled with care but are very heavy and not easily handled by one mechanic or even one mechanic and a helper. Therefore positioning of the means for removal is important and ease of positioning for the mechanic is very important because often he is working alone and sometimes it is important to do the work as rapidly as possible because schedules are being interrupted.

SUMMARY OF THE INVENTION

The clamping means for a brake assembly or the like may be partial bands clamped from opposite directions and are rotatable 360° to assist in alignment in that direction. The clamping means is actuated by a mechanical advantage which can be a hydraulic cylinder or a screw jack member. Vertical height of the clamping means is readily achieved by a long frame adjusted at one end remote from the clamping means and further alignment is achieved by a pivot means for the clamping bands. Through this arrangement after wheeling the frame into approximate position final alignment is achieved by operating the entire clamping frame about a horizontal pivot and then final alignment of the clamping members by adjustment of the clamping means on another pivot on the clamping frame. With this arrangement one mechanic can roll the device to a jet airplane wheel from which the wheel has been removed by conventional means and then readily position the clamping means about the brake assembly and actuate the clamping means to clamp the brake assembly and then pull the device away to remove the brake assembly. Repositioning is simply the reverse of removal.

BRIEF DESCRIPTION OF THE DRAWING

FIG. 1 is a perspective view of a purely mechanical version of the present invention in position to engage the brake of an aircraft wheel assembly.

FIG. 2 is a side elevation view of the device shown in FIG. 1.

FIG. 3 is a top plan view of the clamping portion of the device shown in FIG. 1 with dotted lines to illustrate an adjustment.

FIG. 4 is a perspective view of a modified form of the invention of FIG. 1 utilizing hydraulic-pneumatic power.

FIG. 5 is a side elevation view of a latching detail.

FIG. 6 is a perspective view of another latching detail.

FIG. 7 is an enlarged perspective view of the transport latching lock.

FIG. 8 is an enlarged side view of a modified latch to replace the one shown in FIG. 6.

FIG. 9 is a hydraulic schematic diagram of the hydraulics in the device shown in FIG. 4.

DESCRIPTION OF PREFERRED EMBODIMENTS

In FIG. 1 the entire device is designated generally by reference numeral 10 and comprises a wheel frame designated generally by reference numeral 12 which is made from tubular steel member comprising a triangular frame made up of diagonal members 14, 16 joined to a center brace member 18 and all connected together at the front end to which is welded a plate 20 and joined together intermediate the vehicle by a transverse steel box member 22 which is welded in place. Opposed side frame members 26, 28 extend to an open rear end of the vehicle. Mounted on plates 30 which are welded to the ends of the respective members 26, 28 is a rubber tire dolly wheel assembly 32.

A dolly wheel 34 mounted on the front plate 20 is controlled by means of elongated tongue or towbar 38.

The clamping means to be clamped on a brake assembly or the like comprises a pair of curved clamp members 40, 42 each having a spindle 44 attached thereto substantially in the middle thereof and each spindle 44 of each clamp 40, 42 is mounted in a respective clamp arm 46, 48 each of which respectively is pivoted on a pivot pin 50 inside of a support means comprising a pair of spaced plates 52 through which the respective pivot pins 50 are mounted.

The clamp arms 46, 48 are actuated to be brought together or to be separated thereby clamping or unclamping the clamp members 40, 42 by means of a mechanical screw 56 mounted in a threaded bearing member 58 on arm 48 thru a bearing 59 on arm 46 whereby actuation by rotation of the screw member 56 in one direction by turning a handle 60 causes the arms 46, 48 to be brought together and opposite rotation separates the arms 46, 48.

The plates 52 are mounted inside of a support comprising opposite triangular plates 64 which are pivotally mounted on the end of an elongated clamp support frame member 66 by means of a horizontal pivot pin 68. Frame member 66 is pivotally supported on a large pivot pin 70 mounted through vertical frame support plates 72 welded to the transverse member 22 and to the elongated member 18. The end of clamp frame member 66 opposite from the pivot 68 is provided with a pair of spaced plates 74 in which is mounted a threaded bearing member 76 in which is located a screw actuating member 78 having one end 80 pivotally attached by a pivot 82 mounted in small vertical plates 84 welded to the top of front plate 20. The screw member 78 has a pivoted handle 86 thereon which is rotated by hand to actuate the screw member 78 whereby rotation in one direction raises the end of frame member 66 thereby lowering about the pivot 70 the clamp arms 46, 48 and the clamp member 40, 42 and rotation in the other direction of the screw member 78 accomplishes the opposite, that is, lowers the clamp members 40, 42 to provide rapid alignment substantially in a vertical direction from the ground but of course somewhat arcuate due to the motion about the pivot. Final alignment and adjustment, or preliminary alignment, either one, is achieved by operating the screw 90 which has a handle 92 and is mounted in a threaded bearing 94 attached to the spaced plates 96 on the frame member 66 and into a threaded member 98 attached to the plate 64, on the plates 64 thereby moving the clamp arms 40, 42 in the direction and manner shown substantially in the lefthand side of FIG. 2 to provide further alignment. Final clamping of the clamp members 40, 42 is achieved by operating the screw 56 by turning handle 60 in the manner shown substantially by the dotted line movement represented in FIG. 3.

HYDRAULIC-PNEUMATIC EMBODIMENT

The embodiment shown in FIGS. 4 thru 8, inclusive, is similar to that shown in FIGS. 1 thru 3, inclusive, except that the mechanical screws have been replaced by hydraulic-pneumatic means and certain other revisions have been effected. The complete device in FIG. 4 is represented overall and generally by reference numeral 100 and comprises the front frame members 102, 104 and the center frame member 106 joining to a transverse portion 108 at the front to which is welded a front fender and plate 110 supporting a swivel wheel 112 mounted on a pivot 114 and supporting a pair of opposed plates 116 in which is mounted the axle 118 and to which is mounted a U-frame drawbar member 120 pulled by a tongue 122. A transverse frame member 124 connects the ends of frame members 102, 104, 106 and spaced rearward frame members 126, 128 provide an open end.

The front wheel is typically a 10 × 3 pneumatic wheel the same as rear wheels 134 which are mounted on an axle 136 carried by the frame members 126, 128. A clamp assembly support 136 is bolted or welded to the frame members 106, 124 and comprises a box-like formation of steel plate supporting the entire clamp assembly designated generally by reference numeral 138, which is mounted on a transverse pivot 140 extending between a clamp frame support bracket assembly 142 and the support 136.

The movable clamp arms 146, 148 are made from steel box members pivoted at each end respectively on pivots 150 substantially vertically mounted in the plate support assembly 142 and each arm has welded thereto a pair of triangular plates 154 to which is attached the piston rod 156 of a double hydraulic cylinder and piston arrangement 158 to which is attached respective lines 160 for actuation thereof. The hydraulic cylinder 158 is welded or otherwise attached to the support assembly 142. Projecting from beneath support assembly 142 is a pair of plates 164 to which is pivotally mounted on a pivot 166 a hydraulic piston rod 168 in the hydraulic-pneumatic cylinder 170 which is pivotally attached at one end 172 to the frame member 106 and is actuated by a pneumatic line 174 leading thereto and another line 176.

A transport lock shown in FIG. 7 is a positive means of locking the position of the clamp assembly 138 with respect to the support assembly 136 mainly for transportation purposes. The clamp transport lock assembly comprises a pair of curved plates 180 welded to the top of the support assembly 136 and having openings therein through which project clamp pins 182 mounted on brackets 184 and operating against coil springs 186 therein. A pair of curved tongues or plates 188 inside of respective plates 180 are welded or otherwise attached to the bracket assembly 142 and have openings 190 therein through which projects the pin which may be inserted for positive latching during transportation.

An anti-rotating lock assembly designated generally by reference numeral 196 is mounted with each of the clamp members 198, 200 each of which is rotated on a respective shaft 202 in the respective arm 146, 148. The anti-rotating lock comprises a drawbar rod 204 mounted in a housing 206 and actuated by means of a control member 208 attached to the drawbar member 204. Drawbar member 204 operates inside of a shaft housing 210 through which projects the end of the respective shaft 202 which keys housing 210 to a flat portion 204 thereon. Drawbar member 204 in any one of four holes 211 in housing 210 will prevent the shaft 202 from rotating and thereby hold in place and prevent the respective brake clamp member 189, 200 from rotating during transportation. In FIG. 8 there is a modified anti-rotating latch assembly 220 comprising a gear 222 with notches 224 in which is selectively latched the drawbar 226 operated by a lever 228.

In the hydraulic-pneumatic schematic of FIG. 9 there is a selector valve designated generally by reference numeral 230 to which is attached a line 232 to a reservoir 234 to which is connected a hand pump member 236 and also a motor driven pneumatic pump 238 controlled by means of a check valve 240. Hydraulic cylinder 158 is operated through lines 160 from the selector valve 230 as is the hydraulic pneumatic cylinder 170 through its respective lines 174, 176 so that the operator by controlling the selector valve 230 through the use of the handle 244 may operated either hydraulic cylinder 158, 170 and the device may be operated from an air supply in the reservoir 234 pumped from the pneumatic pump 238 or may be operated by the hand pump 236 if necessary.

It should be noted that as shown in FIG. 2 the respective clamp members 40, 42 may be rotated to horizontal position and the clamp arms 46, 48 lowered inside the open rear end of the wheel frame 12 for the purpose of lifting a brake assembly from a container which is located on the ground inside of the open rear end of the wheel frame 12. This allows the mechanic to pull the device 10 to the location of a brake assembly and lift it out of the container, then lift it to the elevated height of the wheel assembly which is designated in FIG. 1 generally by reference numeral 98 and then rotate the clamped members 40, 42 while clamped about the brake which is designated generally by reference numeral 99 in FIG. 1 and insert the brake 99 on the wheel assembly.

While I have shown and described two different forms of the invention together with illustrative drawings thereof this is by way of illustration only and does not constitute any sort of limitation on the invention since various alterations, changes, deviations, amendments, additions, removals, combinings, interpretations, eliminations, alterations and other deviations may be made in the two forms shown and described without departing from the scope of this invention as defined by proper interpretation of the appended Claims.

What is claimed is:
1. In a device for removing or replacing aircraft brake assemblies elevated from the ground on an aircraft and to turn and lower same to ground level and vice versa:
   a. a wheeled frame having a pair of simultaneously movable clamp arms thereon extending forwardly on said frame whereby said frame may be wheeled adjacent the aircraft and the arms moved into position on the brake assembly thereon,
   b. clamp means on said frame comprising a respective clamp movably mounted on each respective clamp arm whereby each clamp is movable to turn from approximately horizontal to vertical position for the purpose of turning said brake assembly for removal or installation from the ground as for example in a protective container,
   c. means on said wheeled frame for elevating or lowering said clamp means for alignment with an elevated aircraft brake assembly and there being alignment means on said wheeled frame for aligning said clamps with the brake assembly after elevation, and means for selectively releasing said clamps, said clamps being movable on said respective arms from the approximate upright position to clamp a brake assembly while on the aircraft and in approximate upright position, said arms being lowered with said clamped brake assembly therein to a position below the front of said wheeled frame and said clamps moved to approximate horizontal position to turn said brake assembly approximately horizontal for placing same at ground level as for example in a protective container, and said arms also being positionable to clamp a brake assembly on the ground as for example when in a protective container and raise it to aircraft installation level and turn it by moving said clamps to align the brake assembly on the aircraft,
   d. the clamp consists of a pair of arcuate clamp members,
   e. the means for elevating and lowering the clamp means consists of an elongated clamp frame member,
   f. said clamp members being pivotally mounted near the end of said clamp frame member,
   g. an actuating means for adjusting said clamp frame member,
   h. the mounting for said clamp arms on the frame is a common support pivotally attached to one end of the clamp frame member,
   i. said other end of the clamp frame member being near the front end of said wheeled frame and there being means for moving said end of said clamp frame member near the front end of said frame.

2. The device claimed in claim 1, wherein said actuating means is hydraulic.

3. The device in claim 1, wherein said actuating means is a mechanical screw means.

4. The device in claim 1, wherein the means for moving the front end of the clamp frame is an elongated mechanical screw member actuatable to move the front end of said clamp frame member in elevation.

5. The device in claim 4 wherein: the means for moving the clamp arms consists of a second elongated screw member.

6. The device in claim 5, wherein the means for moving the clamp frame member is a third mechanical screw member actuatable between said frame member and said clamp arm common support.

7. The device in claim 1, wherein: there is a selective latch means for latching said clamps in a selected position of rotation.

8. The device in claim 7: said latch means comprising a portion of a member connected to said clamp and a spring biased member actuated thereagainst.

9. The device in claim 7: said latch means comprising superposed members on said clamp means and said frame and said means inserted therebetween.

10. The device in claim 9: said means inserted being pins spring-biased to remain in place.

11. The device claimed in claim 1, wherein: the means operable to open and close said clamps and the means for changing the elevation thereof each consists of a hydraulic means.

12. The device claimed in claim 1 wherein: the means for actuating said clamp members to open and close same consists of a first hydraulic means,
   wherein the means operable to move both of said clamp members simultaneously in elevation consists of a second hydraulic means, 13. The device claimed in claim 12, wherein each of said first and second hydraulic means consists of a hydraulic cylinder and piston pneumatically operated by air and there being control means therefor.

* * * * *